United States Patent
Melchior et al.

(10) Patent No.: US 6,840,684 B2
(45) Date of Patent: Jan. 11, 2005

(54) HOUSING FOR A COUPLING CONFIGURATION FOR INJECTING AND/OR EXTRACTING OPTICAL SIGNALS

(75) Inventors: Lutz Melchior, Berlin (DE); Volker Plickert, Brieselang (DE)

(73) Assignee: Infineon Technologies AG, Munich (DE)

( * ) Notice: Subject to any disclaimer, the term of this patent is extended or adjusted under 35 U.S.C. 154(b) by 141 days.

(21) Appl. No.: 10/356,790

(22) Filed: Jan. 31, 2003

(65) Prior Publication Data

US 2003/0142925 A1 Jul. 31, 2003

(30) Foreign Application Priority Data

Jan. 31, 2002 (DE) .......................... 102 04 223

(51) Int. Cl.[7] .............................. G02B 6/26; G02B 6/36; G02B 6/38
(52) U.S. Cl. .............................. 385/66; 385/15; 385/89; 385/31; 385/88; 385/92; 385/93; 385/94; 385/53; 385/76; 385/77; 385/78; 385/84
(58) Field of Search .............................. 385/15, 27, 31, 385/47, 53, 59, 38, 66, 76, 77, 78, 84, 88, 89, 92, 93, 94, 147; 372/31

(56) References Cited

U.S. PATENT DOCUMENTS

| 4,165,496 A | * | 8/1979 | Di Domenico et al. ....... 372/31 |
| 4,423,922 A | | 1/1984 | Porter |
| 4,767,171 A | | 8/1988 | Keil et al. |
| 5,497,438 A | * | 3/1996 | Ishikawa et al. ............. 385/38 |
| 5,499,309 A | * | 3/1996 | Kozuka et al. ............... 385/38 |
| 5,537,500 A | * | 7/1996 | Yokoyama .................... 385/31 |
| 5,732,171 A | | 3/1998 | Michel et al. |
| 6,116,788 A | * | 9/2000 | Melchior et al. ............. 385/59 |
| 6,406,196 B1 | * | 6/2002 | Uno et al. ..................... 385/89 |
| 6,614,963 B2 | * | 9/2003 | Melchior et al. ............. 385/47 |
| 2003/0138198 A1 | * | 7/2003 | Plickert ........................ 385/27 |
| 2003/0138217 A1 | * | 7/2003 | Lecomte et al. ............. 385/78 |
| 2003/0142918 A1 | * | 7/2003 | Melchoir et al. ............. 385/76 |

FOREIGN PATENT DOCUMENTS

| DE | 28 51 625 C1 | 6/1980 |
| EP | 0 238 977 A2 | 9/1987 |
| WO | WO 96/00915 | 1/1996 |

* cited by examiner

*Primary Examiner*—Frank G. Font
*Assistant Examiner*—Mary El-Shammaa
(74) *Attorney, Agent, or Firm*—Laurence A. Greenberg; Werner H. Stemer; Ralph E. Locher

(57) ABSTRACT

A housing for a coupling configuration for injecting or extracting optical signals of at least one optical data channel into or from an optical conductor has a housing body. At least one groove is constructed in the housing body, in particular a V-shaped groove, which serves to hold at least one mounting tubelet. At least one recess is formed in the housing body that at least partially includes the base of the groove such that light exiting or entering the mounting tubelet laid in the groove can transilluminate the base of the groove.

27 Claims, 5 Drawing Sheets

HOUSING FOR A COUPLING CONFIGURATION FOR INJECTING AND/OR EXTRACTING OPTICAL SIGNALS

BACKGROUND OF THE INVENTION

Field of the Invention

The invention relates to a housing for a coupling configuration for injecting or extracting optical signals of at least one optical data channel into or from an optical conductor, and to a coupling configuration with a corresponding housing.

Wavelength-division multiplex methods are known in which light signals of several wavelengths are transmitted simultaneously on one optical fiber. The injection or extraction of the signals of several wavelengths or optical data channels into or from an optical fiber is performed in electrooptic modules with the aid of a plurality of transmitting and/or receiving components, the signals of the individual wavelengths being combined or separated in the modules.

Published, European Patent EP 238 977 A, corresponding to U.S. Pat. No. 4,767,171, discloses an electrooptic transmitting and receiving module for a bidirectional communication network in the case of which there are disposed at a spacing from one another between a laser diode and an optical fiber end spherical lenses that focus the laser light onto the fiber end. Disposed between the spherical lenses for the purpose of wavelength separation is a wavelength-selective beam splitter that separates from the beam path light emitted from the fiber end and having a wavelength different from the wavelength of the laser light, and feeds it to a detector or receiving component.

It is disadvantageous of the known module that the light is led through large free-beam regions. Thus, the lenses used operate refractively, that is to say the refractive power acts only at the interface between lens and air. The occurrence of free-beam regions requires a hermetic encapsulation of the module in order to prevent instances of condensation in the free-beam region. Furthermore, the known module must be very stable mechanically and insensitive to temperature fluctuations, in order to ensure reliable injection of the laser light into the optical fiber. It is customary to use metal housings to which the individual subcomponents are welded. The outlay on production and adjustment is relatively high.

International Patent Disclosure WO 96/00915, corresponding to U.S. Pat. No. 5,732,171, discloses a module for multiplexing/demultiplexing optical signals that forms on a substrate a phased-array grating that is used both for separating and for combining a plurality of optical channels. The waveguides are constructed as integrated optical waveguides in glass on silicon. It is disadvantageous of this configuration that the transmitting and receiving components must be mounted uncapped on or at the substrate. Again, the substrates are relatively large, since the waveguides must be guided with large radii and are therefore expensive. A further problem consists in that there is a need for special configurations in order to couple external optical conductors to the substrate with the required precision.

SUMMARY OF THE INVENTION

It is accordingly an object of the invention to provide a housing for a coupling configuration for injecting and/or extracting optical signals that overcomes the above-mentioned disadvantages of the prior art devices of this general type, which is of simple construction and permits simple adjustment of the optical components of the coupling configuration as regards a plurality of degrees of freedom and can be used in this case in conjunction with prefabricated subcomponents. In addition, the aim is to provide a coupling configuration having a corresponding housing.

With the foregoing and other objects in view there is provided, in accordance with the invention, a housing for a coupling configuration for one of injecting and extracting optical signals of at least one optical data channel into or from, respectively, an optical conductor. The coupling configuration has at least one mounting tubelet with at least two optical conductor sections positioned axially one behind another, an injection of light into or extraction of the light from the optical conductor being performed for the optical data channel by reflecting light of the optical data channel at an end face, running obliquely to an optical axis of the optical conductor of one of the optical conductor sections, and reflected light exiting or entering the mounting tubelet at a side thereof having a longitudinal slit formed therein. The housing contains a housing body having a base with a surface. The housing body further has at least one groove formed therein for holding the mounting tubelet and at least partially defined by the surface of the base. The housing body additionally has at least one recess formed therein at least partially formed in the base defining the groove such that the light exiting or entering the mounting tubelet laid in the groove can transilluminate the base of the groove.

Accordingly, the solution according to the invention is distinguished by the construction of at least one groove, in particular a V-shaped groove in the housing body, and by at least one recess that also at least partially includes the base of the groove such that light exiting or entering a mounting tubelet laid in the groove can transilluminate the base of the groove.

The mounting tubelet in this case contains at least two optical conductor sections positioned axially one behind another. Light is injected or extracted at a beveled end face, provided with a wavelength-selective filter or a beam splitter, of a waveguide section in the transverse direction. The light reflected at the beveled end face transilluminates a glass ferrule containing the optical conductor, and subsequently the mounting tubelet, for which purpose the latter preferably has a longitudinal slot. Subsequently, owing to the recess in the base region of the groove, the light can transilluminate the base region of the groove and exit the housing, it being preferred for an optical transmitting and/or receiving assembly to be coupled to the housing in the exit direction. The beam path is correspondingly inverted in the case of an injection of light into the optical conductor.

The forming of a groove, in particular a V-shaped groove, provides a self-adjusting configuration that automatically fixes the mounting tubelets inserted into the V-shaped groove in two degrees of freedom (x- and y-directions). It is likewise possible to make a rotary adjustment of a mounting tubelet with respect to the angle of rotation in a simple way by rotating the mounting tubelet in the V-shaped groove about its own axis, the optical conductor sections disposed in the mounting tubelet also being rotated together with the beveled end faces of the sections such that the direction of the transverse light extraction can be set easily.

In a preferred configuration of the invention, there is provided in the housing body a springing element that presses the mounting tubelet into the groove and thereby in a simple way permits the mounting tubelet to be held in a springing fashion and disposed with more precision in the groove. The springing element preferably serves in this case as a self-adjusting prefixing mechanism during mounting subsequent to which additional fixing can be performed.

The spring element is preferably constructed as a flat spring platelet that is mounted in the housing. The spring platelet is fastened, for example, at undercuts and/or projections on the housing body. The construction as a flat spring platelet has the advantage that force can be transferred onto the mounting platelet via a potentially large contact region (the flat surface of the spring platelet), and generous tolerances are therefore permitted. Again, the flat spring platelet provides the mounting platelet with a certain degree of protection against the surroundings of the housing.

In an advantageous refinement, the housing body has a stop surface that serves as interface for the transmitting and/or receiving assembly, in particular a TO assembly. The housing stop surface is formed by one side, in particular the underside of the housing body. In this case, holding regions are constructed on the housing stop surface for coupling a transmitting and/or receiving assembly, that are formed, for example, as holding bores introduced into the housing stop surface. Circular holding bores for holding a TO cap of a TO assembly in each case are proved, in particular.

For the purpose of coupling the transmitting and/or receiving assembly, the holding regions advantageously directly border the at least one recess in the base region of the groove. This ensures that the light transilluminating the base of the groove is directly injected into or extracted from the transmitting and/or receiving assembly. However, it is also possible in principle for the light first to be deflected, for example by mirrors or prism elements, after transilluminating the base of the V-shaped groove, and then to be injected into the transmitting and/or receiving assembly.

The spacing of the housing stop surface from the optical axis of a mounting tubelet laid in the groove is preferably dimensioned in accordance with the focal length of a transmitting unit or of the sensitive surface of a receiver unit on the transmitting and/or receiving assembly. Fine setting of the necessary imaging lengths can be performed by the thickness of a mounting ring that supports the assembly to be coupled and which is fastened, in particular welded, on the housing stop face. It is thereby possible for components with different imaging lengths to be mounted on the housing. The housing is therefore compatible as regards the use of a multiplicity of different transmitting and receiving components.

In accordance with another feature of the invention, the housing body has a further side opposite the side having the stop surface. The further side of the housing body has a further recess formed therein into which the mounting tubelet and the springing element can be inserted.

The housing is preferably an unipartite configuration, being readily demoldable and thus capable of production using a forming process, for example injection molding. The production is performed, for example, by a metal spraying process followed by a sintering process.

In an advantageous refinement, the housing is formed of a material that has substantially the same coefficient of expansion as a mounting tubelet introduced into the V-shape groove. It is therefore impossible for the configuration to become maladjusted in the event of heating cycles.

In accordance with a further feature of the invention, the housing body has a T profile in a shape of a symmetrical double T support.

In a preferred refinement, it is provided that a gap necessarily present between the mounting tubelet laid in the V-shaped groove and an entry or exit window of a coupled transmitting and/or receiving assembly is filled by an optically transparent polymer. The use of an optically transparent polymer permits a closed guidance by waveguide in the module that is stable in humid heat and permanently elastic. In particular, the closed guidance of the light has the effect that there are no end faces to the air at which moisture could condense. The component is therefore stable when operated in humid heat. A further advantage consists in that the light is additionally focused by the polymer with its refractive index greater that air.

An optically transparent silicone is preferably used as the polymer. Silicones are permanently elastic and therefore shock-stable and adhere well to the optical end faces.

The housing preferably forms a coupling region for a plug receptacle into which an optical plug is inserted. The coupling region has undercuts that can be latched with latching noses of a plug receptacle.

The invention also relates to an optical coupling configuration having the housing described above. The coupling configuration has at least one mounting tubelet with at least two optical conductor sections positioned axially one behind another. An injection of light into or extraction of light from the optical conductor is performed for a particular optical data channel by reflecting light of the optical data channel at an end face, running obliquely to the optical axis of the optical conductor of an optical conductor section, the reflected light exiting or entering the mounting tubelet at the side thereof, in particular through a longitudinal slit in it.

In the coupling region of the housing, the coupling configuration preferably has a further mounting tubelet that is coupled via a coupling device to the mounting tubelet disposed in the V-shaped groove and serves for holding a plug pin of an optical plug.

A plug receptacle is connected in a latchable fashion to the housing body and preferably has supporting legs for fastening the plug receptacle, and thus also the housing, on a printed circuit board. Plugging forces occurring when an optical plug is inserted are absorbed via the supporting legs by the printed circuit board such that the forces do not act on the contacting devices of the transmitting and/or receiving unit coupled to the housing body, for example the contact legs of a TO housing.

Other features which are considered as characteristic for the invention are set forth in the appended claims.

Although the invention is illustrated and described herein as embodied in a housing for a coupling configuration for injecting and/or extracting optical signals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
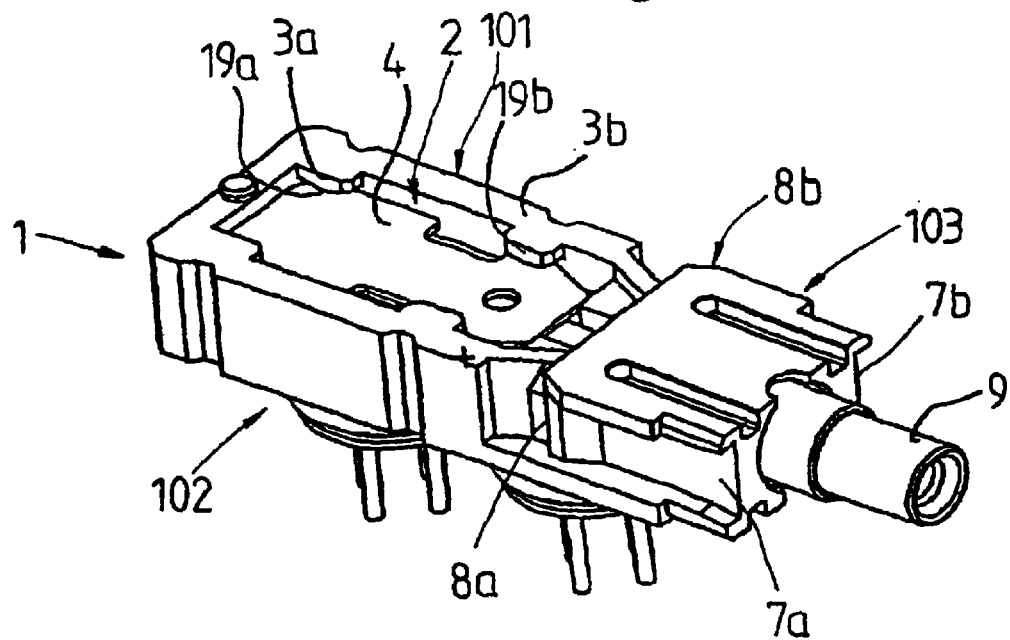
FIG. 1 is a diagrammatic, top perspective view of a housing for an optical coupling configuration having two optical subassemblies, coupled to the housing, in a To design in accordance with the invention.

Referring now to the figures of the drawing in detail and first, particularly, to FIG. 1 thereof, there is shown a coupling configuration for injecting and/or extracting optical signals of at least one optical data channel into and from, respectively, an optical conductor, and a housing 1 of such a coupling configuration.

Figure 2:
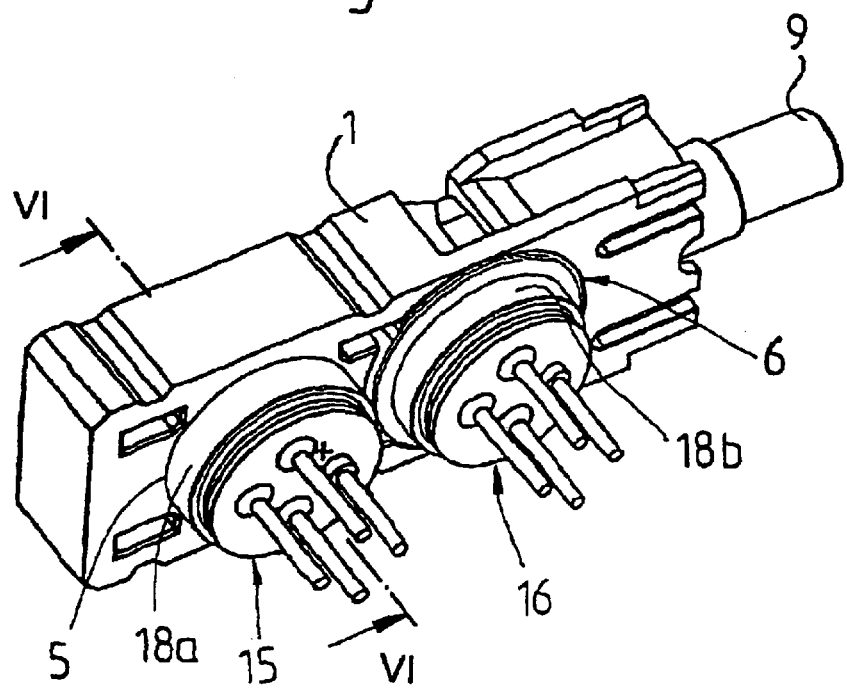
FIG. 2 is a bottom perspective view of the housing shown in FIG. 1.

In accordance with FIGS. 1 and 2, the housing 1 has a substantially rectangular shape and a top side 101 and an underside 102. Located in a region of the top side 101 is an elongated opening 2 in the middle of which a V groove is constructed centrally, as is further explained with the aid of FIGS. 6 and 7. Constructed at an edge of the opening 2 on both sides are undercuts 3a, 3b with noses 19a, 19b that fix a spring platelet 4 in the housing 1, which exerts a spring force on a mounting tubelet inserted into the V groove and substantially covers the opening 2.

Two basic bores 5, 6 that respectively serve for holding an optical subassembly 15, 16, in a TO design in the exemplary embodiment illustrated, are constructed on the underside 102 of the housing. The subassemblies 15, 16 are, for example, an optical transmitting assembly 16 and an optical receiving assembly 15. The subassemblies 15, 16 are respectively inserted into one of the basic bores 5, 6 with their region at an end face. They are fastened to the housing 1 in each case via a mounting ring 18a, 18b that, is permanently connected to the subassembly 15, 16 and, is welded onto the underside 101 of the housing 1.

A coupling region 103 is formed by the housing 1 in the front region thereof. The coupling region 103 has two lateral guide grooves 7a, 7b that respectively form at their end an undercut 8a, 8b. Emerging centrally from the front coupling region 103 is a mounting sleeve 9 that is coupled to the mounting tubelet and in which an optical conductor is disposed, and to which a plug pin of an optical plug can be coupled.

Figure 3:
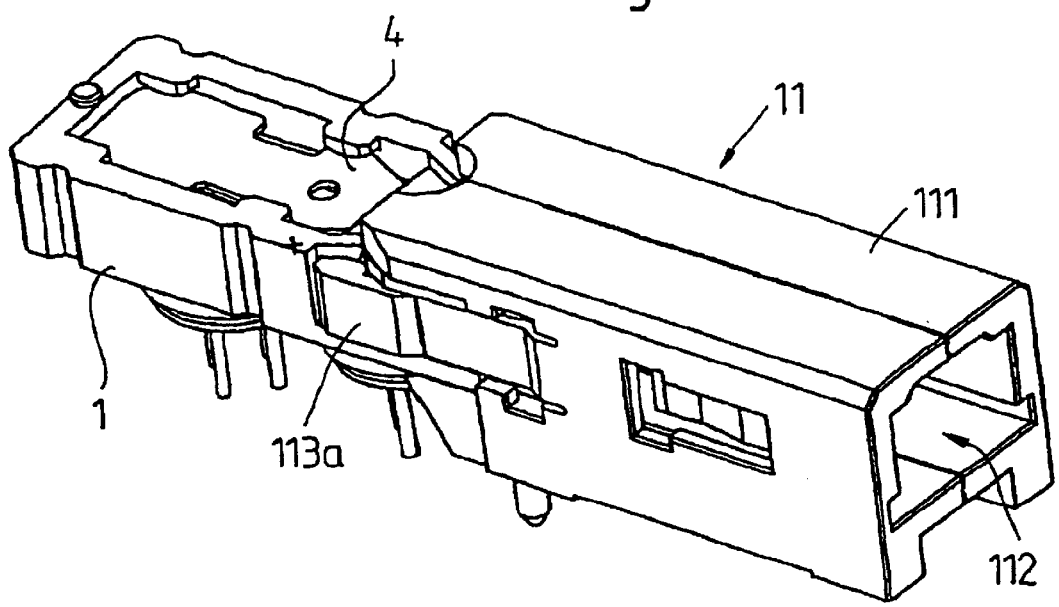
FIG. 3 is a perspective view of the housing shown in FIG. 1 with a coupled plug receptacle.
Figure 4:
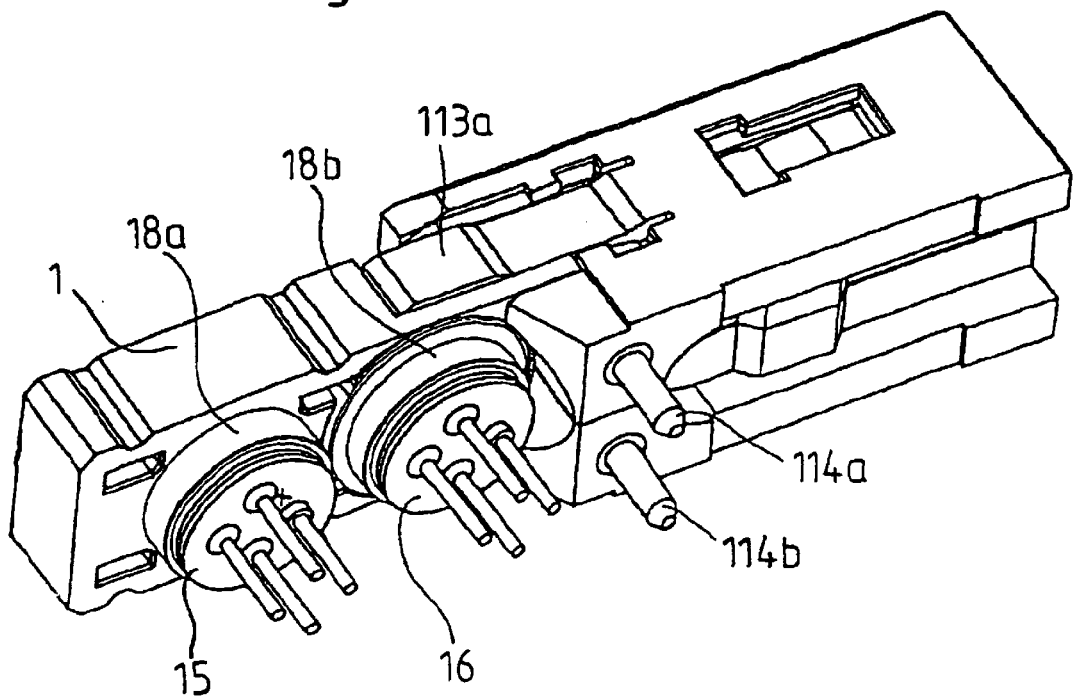
FIG. 4 is a bottom perspective view of the housing and the plug receptacle shown in FIG. 3.
Figure 5:
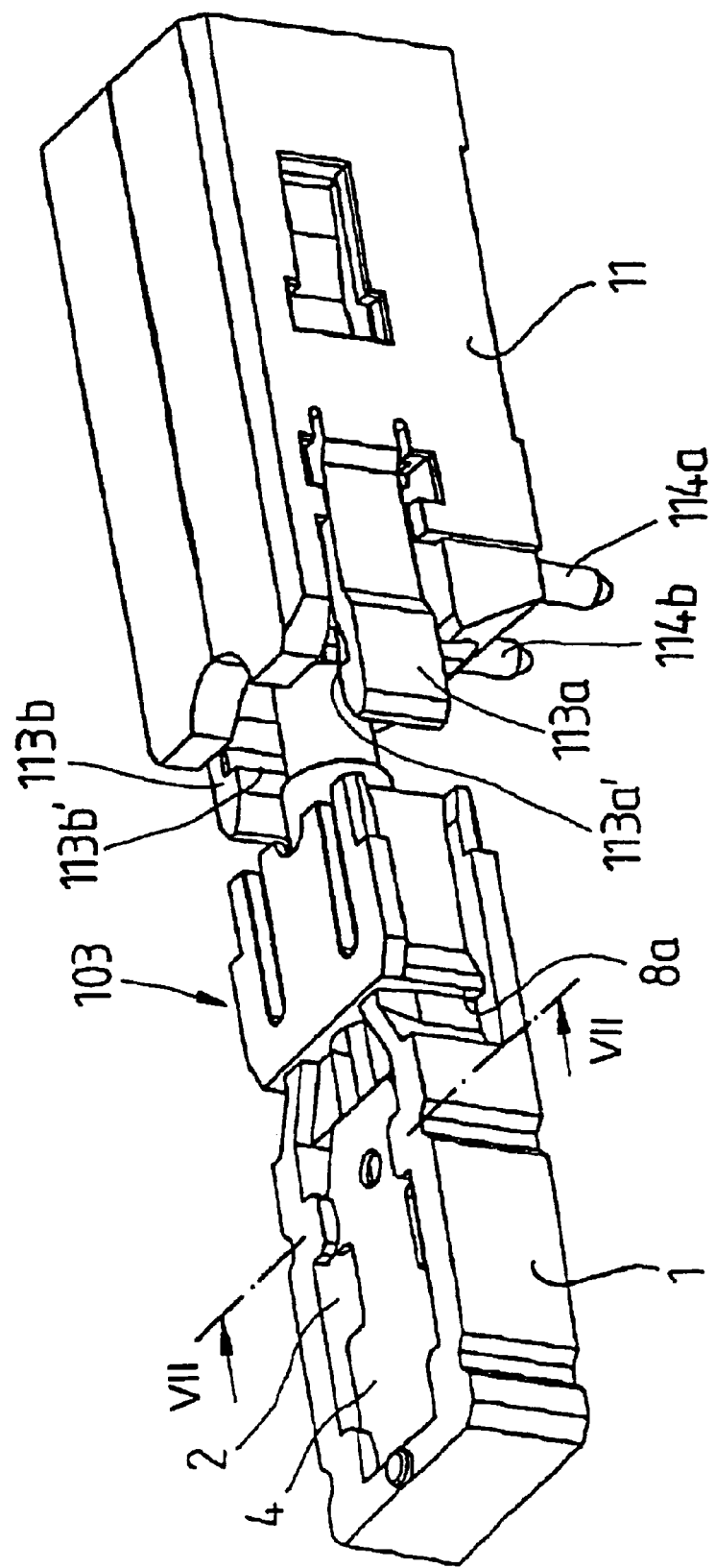
FIG. 5 is a perspective view of the housing of FIGS. 1-3 without coupled optical subassemblies, and the plug receptacle of FIGS. 3 and 4 shortly before a latching position.

FIGS. 3-5 show the housing of FIGS. 1 and 2 together with a plug receptacle 11. A receptacle 11 serves for holding a standardized optical plug and has a housing 111 that forms a holding opening 112 for holding an optical plug to be coupled. Constructed on the side of the receptacle 11 are two latching arms 113a, 113b with front latching noses 113a', 113b' that correspond to the guide grooves 7a, 7b of the housing 1. A secure and at the same time disconnectable connection between the receptacle 11 and the housing 1 is performed via latching of the latching noses 113a', 113b' with the undercuts 8a, 8b of the housing 1.

In accordance with FIG. 4, the receptacle 11 has in a base region two supporting legs (so-called "studs") 114a, 114b, via which the receptacle 11 and the housing 1 latched with the receptacle 11 can be fixed on the printed circuit board of the user. Plugging forces occurring when an optical plug is plugged into the receptacle 11 can be absorbed via the supporting legs 114a, 114b and kept away from the contact legs of the TO subassemblies 15, 16.

Figure 8:
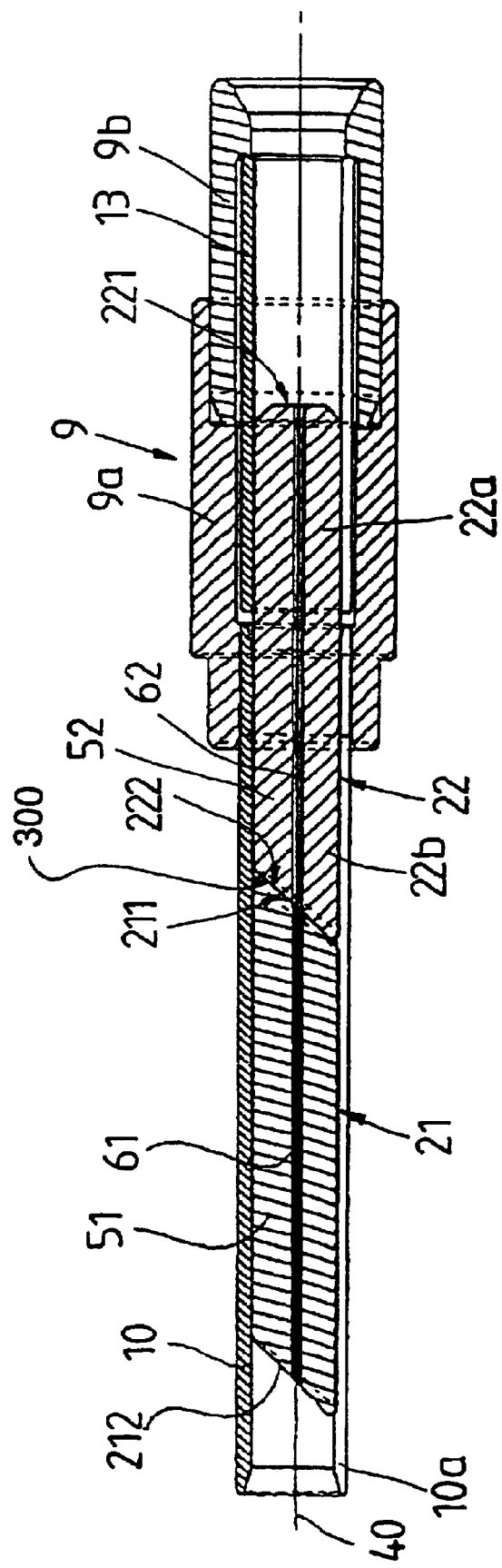
FIG. 8 is a sectional view through a coupling device integrated in the housing shown in FIGS. 1-7.

FIG. 8 shows the construction of the actual coupling configuration for injecting and extracting light into or from an optical conductor. The coupling configuration has a standard mounting tubelet 10, which preferably is formed of phosphor bronze, and in which a plurality of, two in the exemplary embodiment illustrated, waveguide sections 21, 22 are disposed axially one behind another. One waveguide section 22 projects by a defined extent from the mounting tubelet 10 and has at its projecting end 22a a polished end face 221 disposed at an angle of 90° or approximately 90° to a longitudinal axis 40 of the mounting tubelet 10. A polished end face 222 aligned at an angle of 45° to the longitudinal axis 40 is located at its other end 22b located in the mounting tubelet 10.

The waveguide section 21 adjoining the waveguide section 22 has two polished end faces 211, 212 aligned in each case at an angle of 45° to the longitudinal axis 40 of the mounting tubelet 10. It is also possible in principle in each case for an angle differing from 45° to be provided at both waveguide sections 21, 22.

Each waveguide section 21, 22 contains a ferrule (fiber stub) 51, 52 and an actual optical conductor 61, 62 that guides optical signals to be transmitted, the optical conductors 61, 62 being guided in each case in a way known per se in a central, high precision bore in the ferrule 51, 52. The ends of the optical conductors 61, 62 are likewise beveled in this case. "Ferrule" is understood as any structure that embraces and holds the actual optical conductor. The ferrules usually are formed from a ceramic or plastic. In the present case, they consist, however, of glass in order, as will be set forth later, to permit light to be injected and/or extracted perpendicular to the longitudinal axis 40 of the mounting tubelet 10 at the end faces 211, 222, bearing against one another, on the waveguide sections 21, 22.

The mounting tubelet 10 is constructed as a split sleeve and has a longitudinal slit 10a for this purpose.

Because of the construction as a split sleeve, the mounting tubelet 10 exerts a springing force on the waveguide sections 21, 22 and centers both with their optical conductors 61, 62 positioned exactly in the core.

The two waveguide sections 21, 22 are mounted in the mounting tubelet 10 in such a way that the polished end faces 211, 222 aligned at an angle of 45° bear against one another. A possibly present gap between the end faces 211, 222 can be filled by an immersion gel 300. A wavelength-selective filter (not illustrated separately) is applied to the beveled, polished end face 211 of the left-hand waveguide section 21. Light that is injected into one waveguide section 22 via the perpendicularly aligned end face 221 and strikes the wavelength-selective filter either passes the filter as a function of its wavelength and is consequently injected into the bordering waveguide section 21, or it is reflected at the filter and extracted perpendicularly or essentially perpendicularly in relation to the longitudinal axis of the mounting tubelet 10, in which case it transilluminates the sheath of the glass ferrule 51 and passes through the longitudinal slot 10a of the mounting tubelet 10. In this case, the filter surfaces are aligned with reference to their angle of rotation such that the light is emitted substantially precisely downward and thus through the longitudinal slot 10a. This is performed by rotating the mounting tubelet 10 in the V groove of the housing 1 (compare under FIGS. 6 and 7).

Light injected into the waveguide section 21 is likewise reflected downward at the further oblique end face 212.

There is thus a separation (or a unification in the case of the inverse beam path) of light signals of different wavelengths $\lambda 1$, $\lambda 2$.

Consequently, the mounting tubelet 10 is preferably located in the housing 1 by disposing at a right angle or approximately at a right angle to the longitudinal axis 40 of the waveguide tubelet 10 a plurality of transmitting and/or receiving assemblies 15, 16 via which light is injected and/or extracted into or from the waveguide 61, 62 in a wavelength-selective fashion. In this case, it is even possible to provide more than two transmitting and/or receiving assemblies on the same construction in principle.

In an alternative refinement, there is provided instead of a wavelength-selective filter a beam splitter that is fitted on the beveled, polished end face 211 of the left-hand waveguide section 21. This is a 3 dB beam splitter, for example. Because of the beam splitter, incident light is only partially passed on and injected into the bordering waveguide section 21. The other portion is reflected and extracted.

The mounting tubelet 10 can be coupled via the sleeve 9 (compare FIG. 1) to a plug ferrule of an optical plug. The sleeve 9 is preferably of bipartite construction and contains two component sleeves 9a, 9b. It is part of a coupling device that in addition to the bipartite sleeves 9a, 9b includes a further mounting tubelet 13 for a plug ferrule. The optical plug is plugged into the plug receptacle 11 (compare FIGS. 3-5). In this case, the plug receptacle 11 takes over in a known way functions of performance and latching in the case of the optical coupling.

Figure 6:
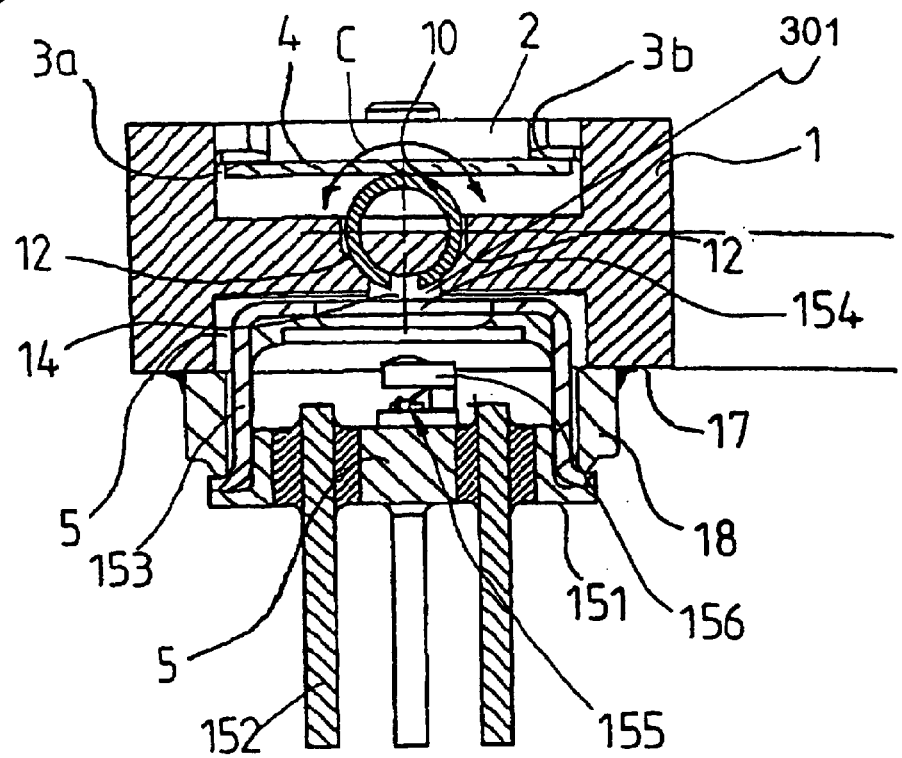
FIG. 6 is a cross-sectional view through the housing shown in FIG. 2 and taken along the line VI—VI.

The exact construction of the housing 1 is now explained with the aid of FIG. 6.

In accordance with FIG. 6, the housing 1 has the shape in cross section of a symmetrical double T support. The housing body has in the region of its top side 101 the elongated opening 2 which has already been mentioned. Constructed centrally in the housing in the opening 2 is a V-shaped groove 12 that is formed by opposite flanks on the housing body. The mounting tubelet 10 of FIG. 8, which includes the optical conductor sections 21, 22, lies in the V-shaped groove 12.

The mounting tubelet 13 is positioned and adjusted essentially automatically in the x- and y-directions because of the V-shaped groove 12. In this case, it is pressed into the V-shaped groove 12 by the springing platelet 4 with its flanks. The springing platelet 4 is latched at the undercuts 3a, 3b of the housing 1 and thereby locks the mounting tubelet 13 in the V-shaped groove 12. At the same time, it permits rotation of the mounting tubelet about its own axis, as indicated in FIG. 6 by the double arrow C. It is thereby also possible for the waveguide sections 21, 22 included in the mounting tubelet to be rotated about their longitudinal axis.

The waveguide sections 21, 22 disposed in the mounting tubelet 13 are adjusted such that light deflected at the obliquely running end faces is deflected downward substantially perpendicular to the waveguide axis 40 in the tubelet. After the rotary adjustment, the mounting tubelet 10 is preferably additionally fixed by adhesion or laser welding. The assembly in which the finally prepared mounting tubelet is fixed in the housing body can therefore be tested separately.

Extending in the region of a base 12a (compare FIG. 7) of the V-shaped groove 12 is an opening 14, limited in the axial direction, that is simultaneously connected to the base region of the corresponding basic bore 5. Consequently, light extracted from the beveled end faces 211, 212 of the optical conductor sections in a fashion substantially perpendicular to the waveguide axis 40 can pass through the opening 14 and be radiated in the direction of a coupled optical subassembly 15, 16 or received by it.

The opening 14 preferably extends in each case only in the region of the V-shaped groove 12 from which light extracted from the waveguide tubelet 10 radiates. However, it is also possible in principle for the recess to extend over the entire region of the V-shaped groove 12, in which case there would be a need, if appropriate, to take measures for the strength of the housing.

Constructed on the underside 102 of the housing 1 is a housing stop surface 17 that constitutes an interface for coupling the optical transmitting and/or receiving assemblies 15, 16, the optical TO assembly 15 in the exemplary embodiment.

The TO assembly 15 has a base plate 151 with four electrical bushings 152 that serve to make electric contact between an optical transmitting or receiving element or a monitor diode and a preamplifier unit. Furthermore, the TO assembly 15 has a housing part 153 that forms a window 154 on its top side such that light can enter or exit the TO housing. In the exemplary embodiment illustrated, the transmitting or receiving component is a monitor diode 155 onto which there falls, via a lens 156, light that is extracted from the optical conductor and passes through a longitudinal slot 10a of the mounting tubelet 10, the open base of the V-shaped groove 12 and the opening 14 before it strikes the window 154 of the TO housing.

The TO assemblies 15, 16 are in each case permanently connected to the mounting ring 18, whose length is measured such that a defined spacing is set between the fixed mounting tubelet 10 in the V-shaped groove 12 and the TO housing base 151.

A TO cap 153 reaches during adjustment into the bore 5 of the housing 1. As already mentioned, the base of the bore 5 is penetrated toward the V-shaped groove 12 by an elongated exposed part formed by the opening 14.

It may further be pointed out that the gap between the beam exit surface from the mounting tubelet 10 and the light entry or light exit opening 154 in the TO window is filled by an optically transparent polymer 301. An optically transparent silicone material, for example, is used. Such a polymer focuses the light additionally, thereby improves the coupling efficiency and provides protection against condensing moisture on optical end faces. At the same time, the silicone is permanently elastic and adheres effectively to the optical end faces.

Figure 7:
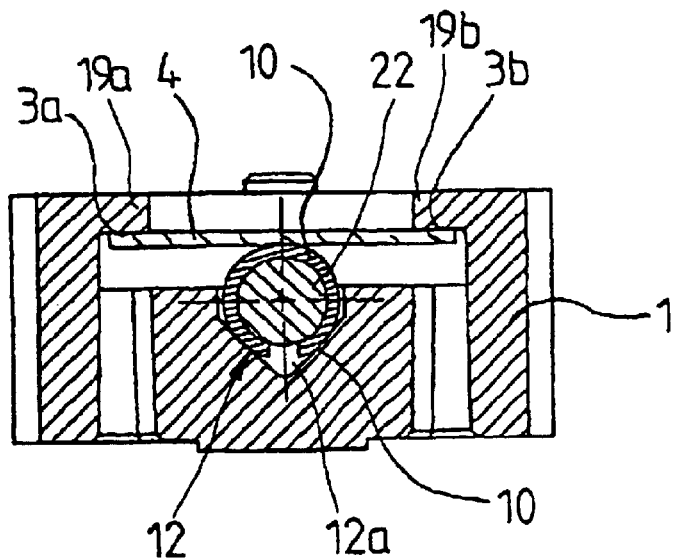
FIG. 7 is a sectional view through the housing shown in FIG. 5 and taken along the line VII—VII.

FIG. 7 shows a section through the housing along the line VII—VII shown in FIG. 5. There is no longer any opening in the base region 12a of the V-shaped groove 12 provided in this region. Also plainly in evidence are the projections of the undercuts 3a, 3b with the latching noses 19a, 19b, which hold the spring plate 4 on the housing 1.

The configuration of the invention is not limited to the exemplary embodiments set forth above. For example, the V-shaped groove 12 can also be constructed in the shape of a circle, a parabola etc. and/or in some other way in the housing 1.

We claim:

1. A housing for a coupling configuration for one of injecting and extracting optical signals of at least one optical data channel into or from, respectively, an optical conductor, the coupling configuration having at least one mounting tubelet with at least two optical conductor sections positioned axially one behind another, an injection of light into or extraction of the light from the optical conductor being performed for the optical data channel by reflecting light of the optical data channel at an end face, running obliquely to an optical axis of the optical conductor of one of the optical conductor sections, and reflected light exiting or entering the mounting tubelet at a side thereof having a longitudinal slit formed therein, the housing comprising:

a housing body having a base with a surface, said housing body further having at least one groove formed therein for holding the mounting tubelet and at least partially defined by said surface of said base, said housing body additionally having at least one recess formed therein at least partially formed in said base defining said groove such that the light exiting or entering the mounting tubelet laid in said groove can transilluminate said base of said groove.

2. The housing according to claim 1, further comprising a springing element pressing the mounting tubelet into said groove.

3. The housing according to claim 2, wherein said spring element is a flat spring platelet mounted in said housing body.

4. The housing according to claim 3, wherein said housing body has at least one of undercuts and projections and said flat spring platelet is fastened in said housing body by at least one of said undercuts and projections.

5. The housing according to claim 2, wherein said housing body has a stop surface serving as an interface for a transmitting/receiving assembly.

6. The housing according to claim 5, wherein said housing body has a side and said stop surface is constructed on said side of said housing body.

7. The housing according to claim 5, further comprising holding regions formed in said stop surface for coupling the transmitting/receiving assembly.

8. The housing according to claim 7, wherein said stop surface has holding bores formed therein functioning as said holding regions.

9. The housing according to claim 7, wherein said holding regions border said at least one recess in said base of said groove.

10. The housing according to claim 5, wherein said groove is a V-shaped groove.

11. The housing according to claim 10, wherein a spacing of said stop surface from the optical axis of the mounting tubelet laid in said V-shaped groove is dimensioned in accordance with a focal length of one of a transmitting unit and a sensitive surface of a receiver unit of the transmitting/receiving assembly.

12. The housing according to claim 6, wherein said housing body has a further side opposite said side having said stop surface, said further side of said housing body having a further recess formed therein into which the mounting tubelet and said springing element can be inserted.

13. The housing according to claim 1, wherein said housing body is of unipartite construction.

14. The housing according to claim 1, wherein said housing body is formed of a material that has substantially an equivalent coefficient of expansion as the mounting tubelet introduced into said groove.

15. The housing according to claim 1, wherein said housing body has a T profile.

16. The housing according to claim 1, wherein said housing body has a T profile in a shape of a symmetrical double T support.

17. The housing according to claim 5, further comprising an optically transparent polymer, the transmitting/receiving assembly has a window formed therein and a space between the mounting tubelet laid in said groove and the window of the transmitting/receiving assembly defines a gap, said gap being filled by said optically transparent polymer.

18. The housing according to claim 17, wherein said optically transparent polymer is an optically transparent silicone.

19. The housing according to claim 1, wherein said housing body has a coupling region for a plug receptacle.

20. The housing according to claim 19, wherein said coupling region has undercuts that can be latched with latching noses of the plug receptacle.

21. The housing according to claim 5, wherein the transmitting/receiving assembly is a TO assembly.

22. The housing according to claim 6, wherein said housing body has an underside and said stop surface is formed on said underside of said housing body.

23. The housing according to claim 16, wherein said double T support has two housing flanks defining said groove.

24. A coupling configuration for injecting or extracting optical signals of at least one optical data channel, the coupling configuration comprising:

at least one mounting tubelet having a side and at least two optical conductor sections each with an optical conductor and positioned axially one behind another, an injection of light into or an extraction of the light from said optical conductor being performed for the optical data channel by reflecting light of the optical data channel at an end face, running obliquely to an optical axis of said optical conductor of one of said optical conductor sections, and the reflected light exiting or entering said side of said mounting tubelet; and a housing containing a housing body having a base with a surface, said housing body further having at least one groove formed therein for holding said mounting tubelet and at least partially defined by said surface of said base, said housing body additionally having at least one recess formed therein at least partially formed in said base defining said groove such that the light exiting or entering said mounting tubelet laid in said groove can transilluminate said base of said groove.

25. The coupling configuration according to claim 24, wherein said side of said mounting tubelet has a longitudinal slit formed therein.

26. The coupling configuration according to claim 24, further comprising:

a coupling device;

a further mounting tubelet coupled via said coupling device to said mounting tubelet disposed in said groove and serves for holding a plug pin of an optical plug.

27. The coupling configuration according to claim 24, further comprising a plug receptacle connectable in a latchable fashion to said housing body, said plug receptacle having supporting legs for fastening said plug receptacle on a printed circuit board.

* * * * *